April 21, 1931. J. PAIVINEN 1,802,182
TIRE RIM CONTRACTING TOOL
Filed July 2, 1928 3 Sheets-Sheet 1

Inventor
John Paivinen
By Williams, Bradbury,
McColl & Hinkle
Attys.

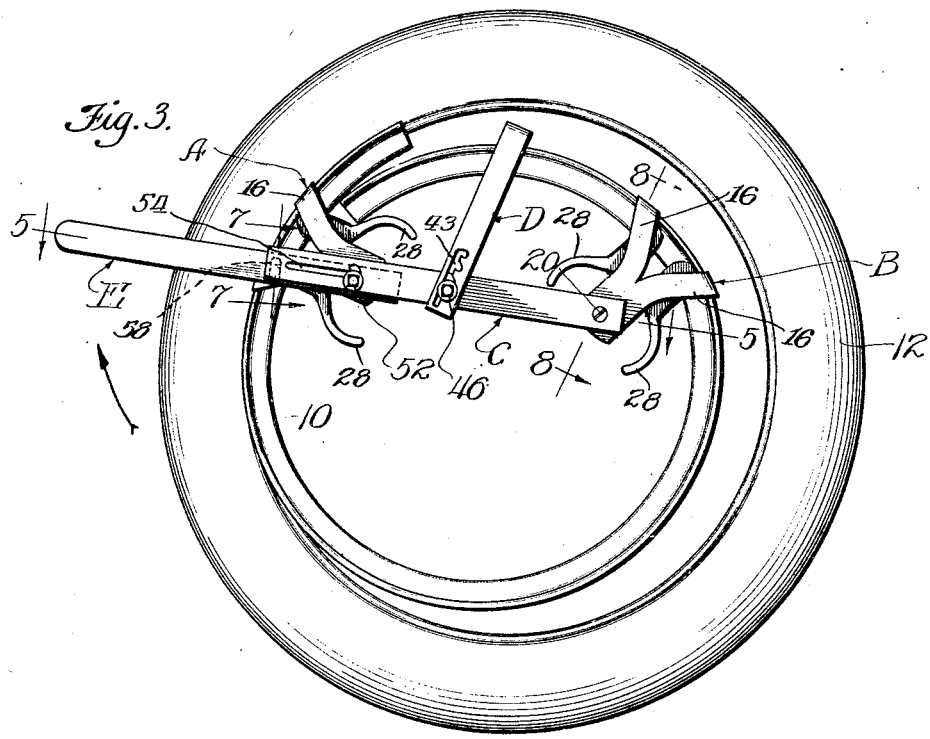
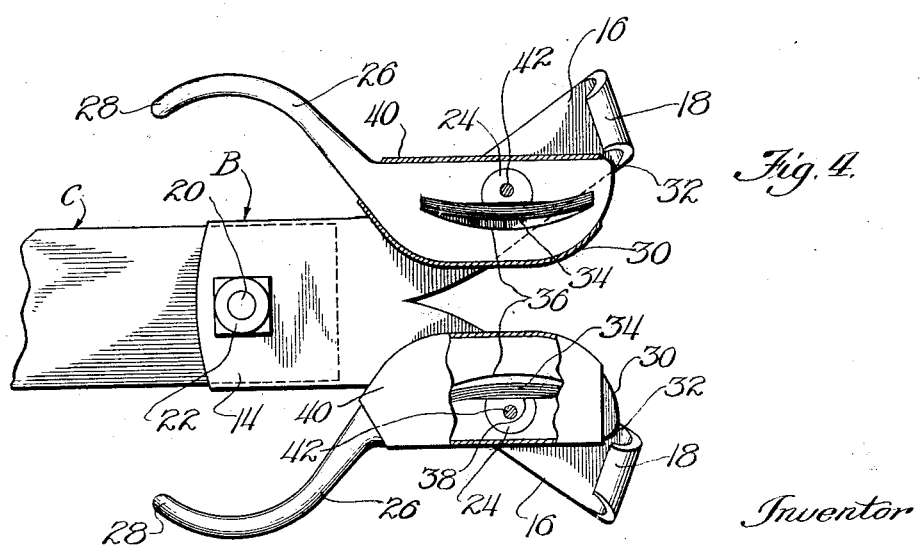

April 21, 1931.  J. PAIVINEN  1,802,182
TIRE RIM CONTRACTING TOOL
Filed July 2, 1928   3 Sheets-Sheet 3

Inventor
John Paivinen
By Williams, Bradbury, McCaleb & Hinkle
Attys.

Patented Apr. 21, 1931

1,802,182

UNITED STATES PATENT OFFICE

JOHN PAIVINEN, OF CHICAGO, ILLINOIS

TIRE-RIM-CONTRACTING TOOL

Application filed July 2, 1928. Serial No. 289,657.

My invention relates to improvements in tools for removing demountable rims from pneumatic tires of the type used on automotive vehicles.

The majority of tire rims now in use are of the demountable or split ring type, and without the use of heavy and fixed rim contracting machines as used by garages generally, it is very difficult to remove the tires from rims of this type.

An object of my invention is to provide a light and inexpensive rim contracting tool capable of being carried by car owners in the usual emergency tool kit.

Another object of my invention is to provide a rim contracting tool that may easily be adjusted for use with rims of different sizes.

Another object of my invention is to provide a rim contracting tool in which the rim supporting members are clamped to the rim, yet removable quickly and by simple operation.

A further object is to provide an improved rim contracting tool which may also be used to expand the rim after the tire has been replaced upon it.

A further object is to provide an improved rim contracting tool which may be used equally easily by right- or left-handed persons.

Other objects will appear from the following description, reference being made to the accompanying drawings, in which Figure 1 is a plan view of the tool constructed in accordance with my invention, showing it as applied to a rim which it is desired to remove from the tire;

Figure 3 is a plan view showing the position of the parts after the tool has been fully operated so that the rim may be removed;

Figure 4 is a detailed view of one of the clamping jaws;

Figure 1:
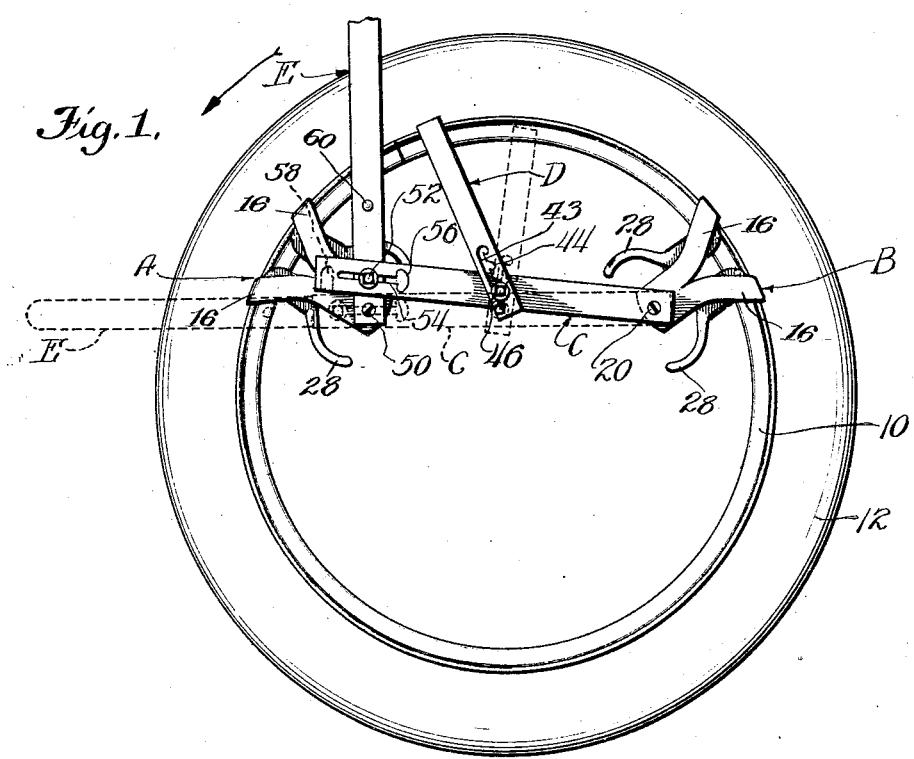

Referring, now, to Figure 1, the tool is constructed generally of clamping jaws A and B, connecting link C, grab link D and operating handle E. A tire 12 is shown mounted on a demountable rim 10. The tool is shown clamped to the rim 10 by means of the jaws A and B.

The jaws A and B each comprise a bifurcated back plate 14 having arms 16 which have hook-shaped end portions 18. The jaw B is pivotally mounted on the link C in any suitable manner, as for example, by means of a bolt 20 having a nut 22.

Fixedly mounted on each arm 16 is a pivot 24 and a locking member 26. The extreme ends of the locking members converge outwardly and form handles 28 which, when pressed toward each other, spread apart the opposite ends of the locking members. This will allow the edge of the rim to be inserted between the hook portions 18 of the jaws and the eccentric cam surfaces 30 of the locking members 26.

Since it is desired to keep the end portion 32 of the cam surface 30 in firm engagement with the edge of the rim at all times, I provide a group of flat leaf springs 34 placed in a depressed compartment 36 in the locking member 26, parallel to and in engagement with a flattened face 38 of the pivot 24.

The pivot 24 is rigidly secured to the arms 16, and it is therefore apparent that by pressing together the handles 28, the spring plates 34 are put under tension, and by releasing the pressure upon the handles, they will return the locking members 26 substantially to their original position with their cam portions 32 bearing against the inside of the rim, thus firmly clamping the jaws upon the edge of the rim.

To prevent dirt and dust from entering the spring compartment 36, and to hold the springs 34 in place, a cover plate 40, having flanged edges fitting over the edges of the locking members 26, is placed on each member 26 and held in position by suitable means, such as a screw 42.

The grab link D is slidably and pivotally and adjustably connected at an intermediate point of the connecting link C by means of a bolt or rivet 46 which passes through an elongated slot 43 formed adjacent one end of the said link D. For purposes of adjustment, this slot is provided with a series of notches 44, each of which is adapted to engage the said bolt. The other end of the grab link D is turned to form a hook 48 adapted to engage over the edge of the rim 10. The operating handle E is pivotally attached to the jaw A by means of a bolt 50. The connecting link C is provided with an elongated T-shaped slot 54 adapted to engage a bolt 52 carried by the handle E, whereby the said link C is slidably and pivotally connected with the handle E.

The head of this slot is indicated by the numeral 56. It will be noted that the bolt 52 is mounted upon the handle E at a point intermediate the bolt 50 which engages the jaw A, and the end of the handle E which is adapted to be grasped by the operator of the device.

It will also be noted that the handle E is provided with a round-headed rivet 60. This rivet is adapted to co-operate with a depression 58 formed in the face of connecting link C when the handle and the links C and D have been moved to the positions shown in Figure 3, i. e., when the rim has been sufficiently contracted to permit it to be separated from the tire, and thus hold the parts in this position.

Figure 2:
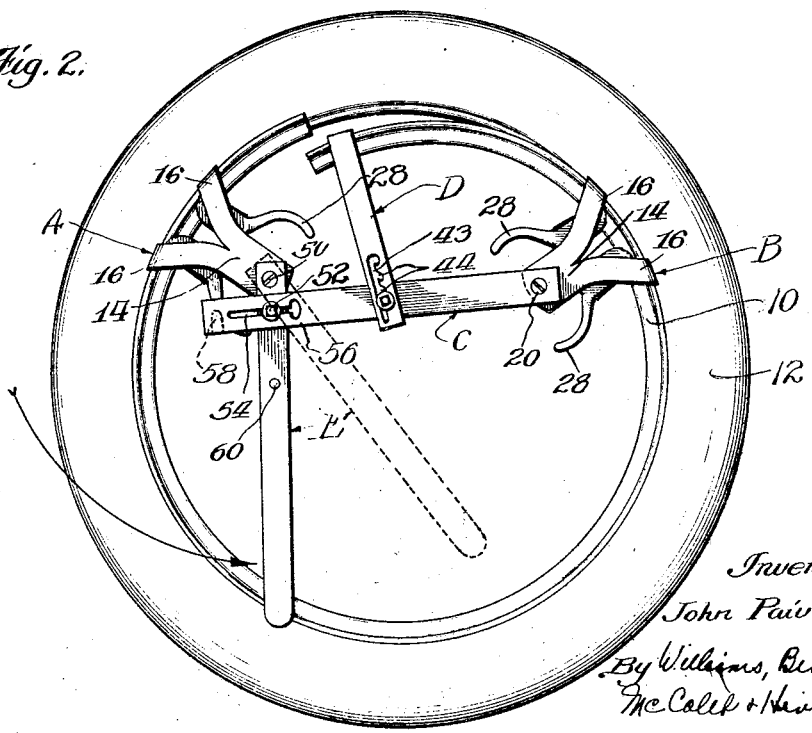
Figure 2 is a plan view showing the positions of the parts during the operation of the removal of a tire.
Figure 5:
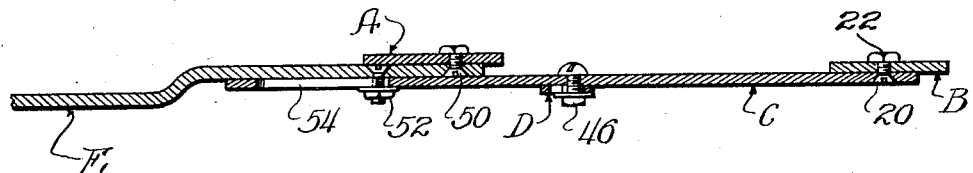
Figure 5 is a cross section on line 5—5 of Figure 3.
Figure 6:
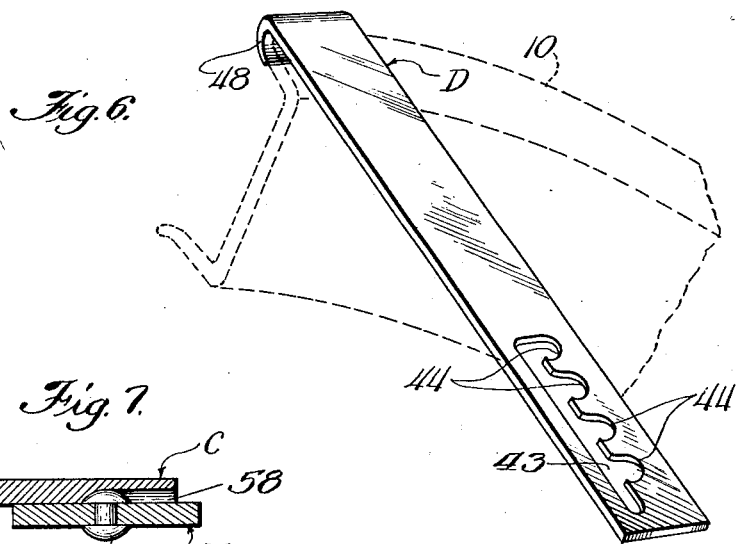
Figure 6 is a perspective view of the grab link.
Figure 7:
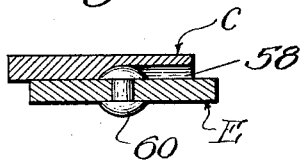
Figure 7 is a cross section on line 7—7 of Figure 3.
Figure 8:
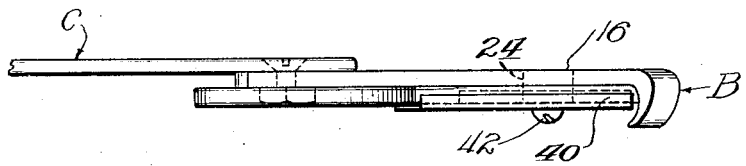
Figure 8 is a detailed elevation on line 8—8 of Figure 3.

In the operation of the tool, the jaws A and B are clamped to the edge of the rim 10 at points on opposite sides of the split in the rim and sufficiently separated so that the bolt 52 will lie near the end of the slot 54. This position is shown in dotted lines in Figure 1. Having thus clamped the tool to the rim, the handle E is swung from the dotted line position to the full line position and the grab link D hooked over the edge of the rim at a point closely adjacent the split. The handle is then rotated counter-clockwise (Figures 1 and 2) until it reaches the position shown in dotted lines in Figure 2, passing through the position shown in full lines in this figure. As the handle is moved from the position shown in full lines in Figure 1 to the position shown in full lines in Figure 2, the grab link D will pull the end of the rim inwardly and, due to the contraction of the rim, its ends will slightly overlap, as shown in Figure 2. Further movement of the handle E to the dotted line position shown in Figure 2 will permit slight expansion of the rim and when the handle is in this position the resiliency of the rim exerted through the grab link D will cause slight pivotal movement of the link C in a clockwise direction about the pivot 20 so that the bolt 52 will rest in the head portion 56 of the slot 54. The handle is then moved from the dotted line position of Figure 2 to the position shown in Figure 3, in which position the parts will be locked together by the engagement of the rivet 60 in the slot 58. During this latter movement of the handle, the jaws A and B will be drawn together, thus further contracting the rim and causing its ends to overlap to a greater degree. For the purposes of illustration the contraction of the rim is slightly exaggerated in Figure 3. When the parts are in this position the tire may, of course, be removed readily from the rim.

When replacing a new tire upon the rim the above described operation is performed in the reverse order. If, when re-expanding the rim to its normal position, the overlapping ends should frictionally bind, the tool may readily be used to expand the rim to a position where its end portions are abutting by shifting the jaw B from the position in which it is shown in Figure 2 toward the jaw A until the bolt 52 rests in the head 56 of the slot 54, and then by shifting the handle E from the full line to the dotted line position shown in Figure 2. During this operation compressive force is exerted on the link C and the jaw B is forced away from the jaw A, thereby spreading the ends of the rim. During this operation the grab link D need not be hooked over the rim, so that the end of the rim may then readily snap into position.

The tool may readily be used by a left-handed person, in which event the parts are reversed and the other side of the head 56 in the slot 54 is brought into engagement with the bolt 52.

It will be apparent that the rivet 60 does not engage the depression 58 in the connecting link C except when the bolt 52 is engaged with the notch 56 and the handle is rotated to the position shown in Figure 3. When the handle is rotated counter-clockwise from the position shown in Figure 1, the rivet passes in an eccentric path beyond the end of the connecting link C.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a rim contracting tool for split rims having a handle pivotally secured to a rim jaw supporting link, and a grab link connected to said supporting link intermediate its ends, rim jaws comprising Y-shaped back plates pivoted on said supporting link, bent over edges on the ends of said Y-legs and locking members pivoted adjacent said Y-legs for securing said jaws to a rim to be contracted.

2. In a rim contracting tool for split rims having a handle pivotally secured to a rim jaw supporting link, and a grab link connected to said supporting link intermediate its ends, rim jaws comprising Y-shaped body members and frictionally holding locking members associated therewith for securing said jaws to a rim to be contracted.

3. A rim engaging jaw for a rim contracting tool, comprising a Y-shaped backing plate, the extremities of said Y-legs bent at right angles to form a rim engaging edge, a spring pressed backing member pivotally secured on each leg of said Y for yieldingly holding a rim against said rim engaging edge, and handle portions on said locking member for disengaging the jaw from a rim.

4. An engaging jaw for a rim contracting tool comprising a Y-shaped backing plate, the extremities of said Y-legs bent at right angles to form a rim engaging edge and a spring pressed locking member pivotally secured on each leg of said Y for yieldingly holding a rim against said rim engaging edge.

In witness whereof, I hereunto subscribe my name this 28th day of June, 1928.

JOHN PAIVINEN.